US012182650B2

(12) United States Patent
Ichikawa (10) Patent No.: US 12,182,650 B2
(45) Date of Patent: Dec. 31, 2024

(54) READING APPARATUS AND READING METHOD

(71) Applicant: Toshiba Tec Kabushiki Kaisha, Tokyo (JP)

(72) Inventor: Takashi Ichikawa, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,147

(22) Filed: Jun. 6, 2023

(65) Prior Publication Data

US 2023/0316011 A1   Oct. 5, 2023

Related U.S. Application Data

(63) Continuation of application No. PCT/JP2022/006702, filed on Feb. 18, 2022.

(30) Foreign Application Priority Data

Mar. 10, 2021   (JP) .................................. 2021-038395

(51) Int. Cl.
  *G06K 7/016*   (2006.01)
  *G06K 7/10*    (2006.01)

(52) U.S. Cl.
  CPC ......... *G06K 7/016* (2013.01); *G06K 7/10732* (2013.01); *G06K 7/10861* (2013.01)

(58) Field of Classification Search
  CPC .............. G06K 7/016; G06K 7/10732; G06K 7/10861; G06K 7/10; G06K 7/14;

(Continued)

(56) References Cited

U.S. PATENT DOCUMENTS 10,410,198 B2 *  9/2019  Yamaguchi .......... G07G 1/0045
2011/0180596 A1   7/2011  Iizaka et al.
(Continued)

FOREIGN PATENT DOCUMENTS

JP   2004-048648 A   2/2004
JP   2010-086201 A   4/2010
(Continued)

OTHER PUBLICATIONS

English Translation of International Preliminary Report on Patentability (Chapter I) and Written Opinion mailed Sep. 21, 2023 in International Application No. PCT/JP2022/006702, 8 pages.

(Continued)

*Primary Examiner* — Seung H Lee
(74) *Attorney, Agent, or Firm* — Kim & Stewart LLP (57) ABSTRACT

A reading apparatus includes a synchronizing signal output unit, a first imaging unit, a second imaging unit, an acquisition unit, and a transmission unit. The synchronizing signal output unit outputs a synchronizing signal. The first imaging unit images a read target at an imaging position from a first direction in synchronism with the synchronizing signal. The second imaging unit images the read target at the imaging position from a second direction in synchronism with the synchronizing signal. The acquisition unit acquires a first image of the read target captured by the first imaging unit in synchronism with the synchronizing signal, and a second image of the read target captured by the second imaging unit in synchronism with the synchronizing signal. The transmission unit correlates the first image and the second image, and transmits the correlated first image and second image.

6 Claims, 7 Drawing Sheets

(58) Field of Classification Search
CPC .... G06K 17/00; G06K 7/1096; G06K 7/1413; G06K 17/0022; G07G 1/00; G07G 1/0045; H04N 1/00
See application file for complete search history.

(56) References Cited

U.S. PATENT DOCUMENTS

| | | | |
|---|---|---|---|
| 2011/0243446 A1* | 10/2011 | Iizaka | G06Q 20/201 382/182 |
| 2012/0048920 A1 | 3/2012 | Iizaka | |
| 2013/0221095 A1 | 8/2013 | Iizaka et al. | |
| 2014/0166741 A1 | 6/2014 | Iizaka | |
| 2016/0171264 A1* | 6/2016 | Mihara | G06K 7/1413 235/375 |
| 2018/0240092 A1* | 8/2018 | Miyagi | G07G 1/0045 |
| 2019/0130140 A1 | 5/2019 | Kuchenbrod et al. | |

FOREIGN PATENT DOCUMENTS

| | | |
|---|---|---|
| JP | 2011-154409 A | 8/2011 |
| JP | 2012-053587 A | 3/2012 |
| JP | 2012-074013 A | 4/2012 |
| JP | 2013-121134 A | 6/2013 |
| JP | 2018-028807 A | 2/2018 |
| JP | 2020-129288 A | 8/2020 |
| JP | 2021-047768 A | 3/2021 |
| KR | 2020-0060469 A | 5/2020 |
| WO | 2014/196272 A1 | 12/2014 |

OTHER PUBLICATIONS

International Search Report (ISR) and Written Opinion mailed May 17, 2022 in International Application No. PCT/JP2022/006702, with Translation of the ISR, 13 pages.

A. Kouchi, "Proposal for Price Cut Processing Using Code128", Automatic Recognition Monthly, Jun. 2005, pp. 41-43 (with Translation).

Request for the Submission of an Opinion (Office Action) mailed Aug. 5, 2024 in Korean Patent Application No. 10-2023-7018908 with English machine translation, 10 pages.

* cited by examiner

READING APPARATUS AND READING METHOD

CROSS-REFERENCE TO RELATED APPLICATIONS

This application is a Continuation Application of PCT Application No. PCT/JP2022/006702, filed Feb. 18, 2022 and based upon and claiming the benefit of priority from Japanese Patent Application No. 2021-038395, filed Mar. 10, 2021, the entire contents of all of which are incorporated herein by reference.

FIELD

Embodiments of the present invention relate to a reading apparatus and a reading method.

BACKGROUND

There is known a reading apparatus that reads, from an image of a read target that is held over a reading window, information relating to the read target. For example, a code reading apparatus reads data of a bar code, when the bar code put on a commodity is held over a reading window by an operator.

A conventional reading apparatus reads information from an image that is captured through a reading window. Thus, it is not possible to read information, based on an image of a surface different from the surface of a read target, which is directed toward the reading window. Taking this into account, a study has been made of a reading apparatus that includes, in addition to a first imaging unit configured to capture an image of a read target through a reading window, a second imaging unit configured to capture an image of the read target without through the reading window, and that reads information from the images captured by the respective imaging units. In addition, with an improvement of image recognition technologies in recent years, an image recognition server that can recognize information from various images has been developed. Thus, a reading apparatus including a plurality of imaging units is connected to the image recognition server over a network, and the image recognition server is entrusted with a process of recognizing images captured by the respective imaging units. Thereby, a high-performance reading system can be constructed.

However, in this kind of reading system, there is concern that if a plurality of images captured by a plurality of imaging units are asynchronously transmitted from the reading apparatus to the image recognition server, the order of images transmitted to the image recognition server changes and the image recognition cannot correctly be performed. In particular, in the case of a reading apparatus that is assumed to be used in such a scene that a plurality of read targets are successively held over a reading window and the information thereof is read, there is a strong possibility that, between images of one read target, an image of another read target is interposed, and erroneous recognition occurs.

DETAILED DESCRIPTION

In an embodiment, a reading apparatus includes a synchronizing signal output unit, a first imaging unit, a second imaging unit, an acquisition unit, and a transmission unit. The synchronizing signal output unit is configured to output a synchronizing signal. The first imaging unit is configured to image a read target at an imaging position from a first direction in synchronism with the synchronizing signal. The second imaging unit is configured to image the read target at the imaging position from a second direction in synchronism with the synchronizing signal. The acquisition unit is configured to acquire a first image of the read target captured by the first imaging unit in synchronism with the synchronizing signal, and a second image of the read target captured by the second imaging unit in synchronism with the synchronizing signal. The transmission unit is configured to correlate the first image and the second image acquired by the acquisition unit, and to transmit the correlated first image and second image to an image recognition server configured to recognize an image of the read target.

Hereinafter, some embodiments are described with reference to the drawings.

First Embodiment

To begin with, a first embodiment is described with reference to FIG. 1 to FIG. 5.

Figure 1:
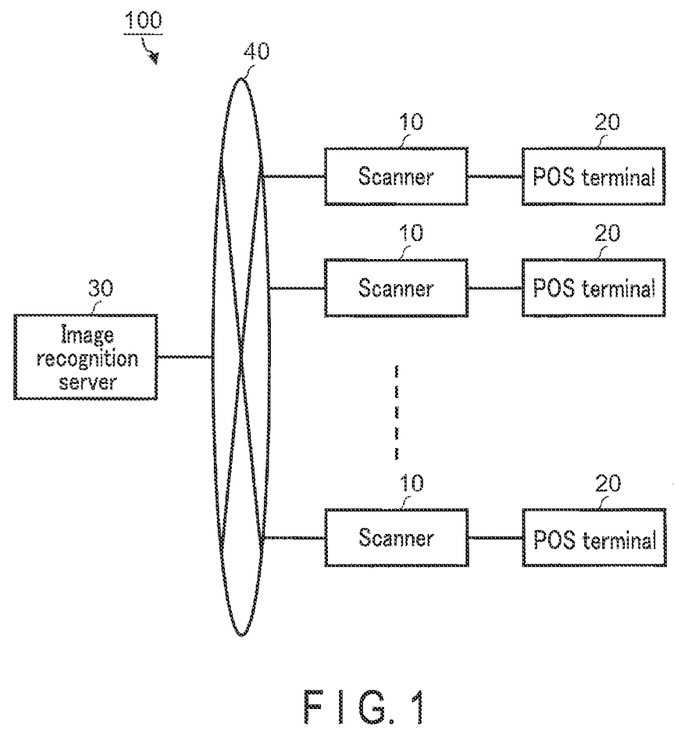
FIG. 1 is an overall configuration diagram of a code reading system according to an embodiment.

FIG. 1 is an overall configuration diagram of a reading system 100 according to the embodiment. The reading system 100 includes a plurality of scanners 10, a plurality of POS (Point of Sales) terminals 20, and an image recognition server 30. The scanners 10 and the POS terminals 20 are associated in a one-to-one correspondence, and are connected by communication cables. The scanners 10 and the image recognition server 30 are connected to a communication network 40. The communication network 40 is typically a LAN (Local Area Network). The LAN may be a wired LAN, or may be a wireless LAN. It is possible that the communication network 40 is, for example, the internet, and the image recognition server 30 is a server serving as cloud computing.

The scanner 10 is an example of a reading apparatus that reads information from images of a read target, which are captured by a plurality of imaging units. In the present embodiment, the read target is a commodity, and the information is a bar code. Specifically, the scanner 10 functions as a code reading apparatus. The bar code is a commodity code in the form of a bar code, which is uniquely set for each of commodities in order to identify each commodity, and the bar code is usually put on a case, a package or the like of the commodity. The scanner 10 outputs the data of the read bar code to the POS terminal 20. Note that the scanner 10 may read, from the image of the commodity, information of a two-dimensional data code, a character code or the like, in place of the bar code.

The POS terminal 20 acquires a commodity code from the data of the bar code that is read by the scanner 10. The POS terminal 20 acquires a price that is set in a price master in association with the commodity code, and executes a registration process of sales data of the commodity, based on the price. In other words, the bar code is a code for obtaining the price of the commodity. The POS terminal 20 is an example of a processing apparatus that processes commodity sales data. Since this type of POS terminal 20 is well known, a detailed description thereof is omitted here.

Figure 2:
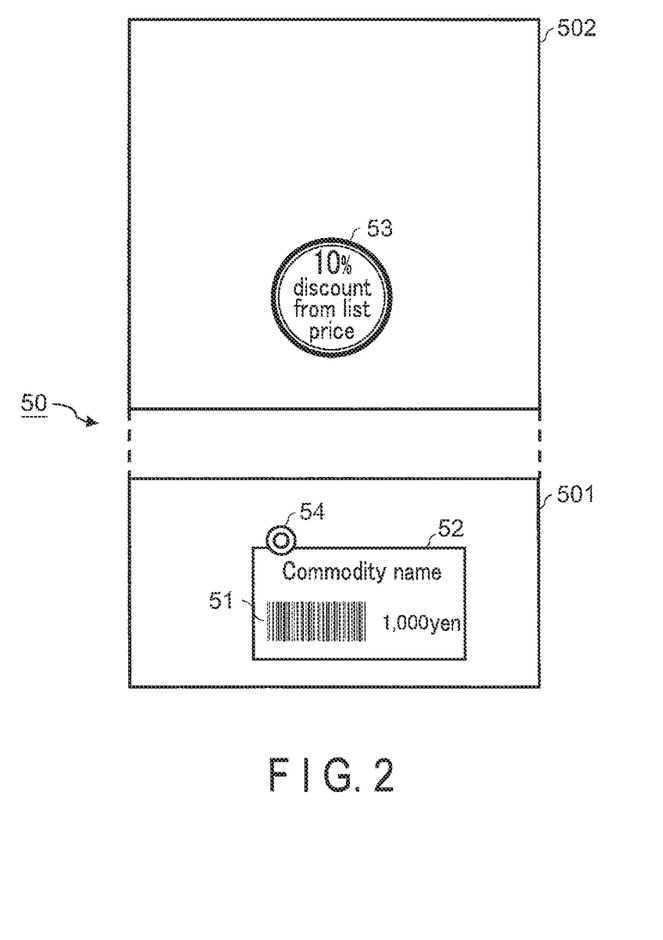
FIG. 2 is a schematic view illustrating an example of a commodity according to an embodiment.

FIG. 2 is a schematic view illustrating an example of a read target, i.e., a commodity 50, according to the embodiment. The commodity 50 is a commodity of a price change object, which is sold at a 10% discount from a usual price. As illustrated in FIG. 2, a bar code label 52, which displays a bar code 51 as well as a commodity name and a usual price, is put on a first surface 501 of a case or a package of the commodity 50. The bar code label 52 may be printed on the case or package, or may be attached to the case or package as a seal-like label.

A price change label 53 is put on a second surface 502 neighboring the first surface 501 of the case or package. The price change label 53 is attached to the second surface 502 as a seal-like label. The price change label 53 is a label displaying price change information relating to a change of the price. The price change label 53 of FIG. 2 displays price change information indicating that the price is discounted at a rate of 10%. The price change information is not limited to the information of the discount rate. For example, the price change information may be information of a discount amount by which the price is discounted, sales price information indicating that the price is changed to a predetermined sales price, information of a premium rate at which the price is increased, or the like.

A flag seal 54 is attached to the first surface 501. The flag seal 54 indicates that the price change label 53 is put on the commodity 50, and the flag seal 54 is attached to the commodity 50 as a pair to the price change label 53. As illustrated in FIG. 2, the flag seal 54 is attached, with at least a part thereof overlapping the bar code label 52. It is not always necessary that the flag seal 54 is overlappingly attached on the bar code label 52. The flag seal 54 may be attached, for example, such that the flag seal 54 is in contact with an edge of the bar code label 52. In short, it suffices if the flag seal 54 is attached near the bar code label 52.

Note that although FIG. 2 exemplarily illustrates the commodity 50 with respect to which the bar code label 52 and flag seal 54 are put on the first surface 501 and the price change label 53 is put on the second surface 502, the bar code label 52, flag seal 54 and price change label 53 may be put on the same surface. For example, in a case where the first surface 501, on which the bar code label 52 is put, has an enough space to put the price change label 53, the price change label 53 and the flag seal 54 are put on the first surface 501. However, if there is no such space, the flag seal 54 is put near the bar code label 52 of the first surface 501, and the price change label 53 is put on the second surface 502. In the present embodiment, such practical use can be adopted.

Figure 3:
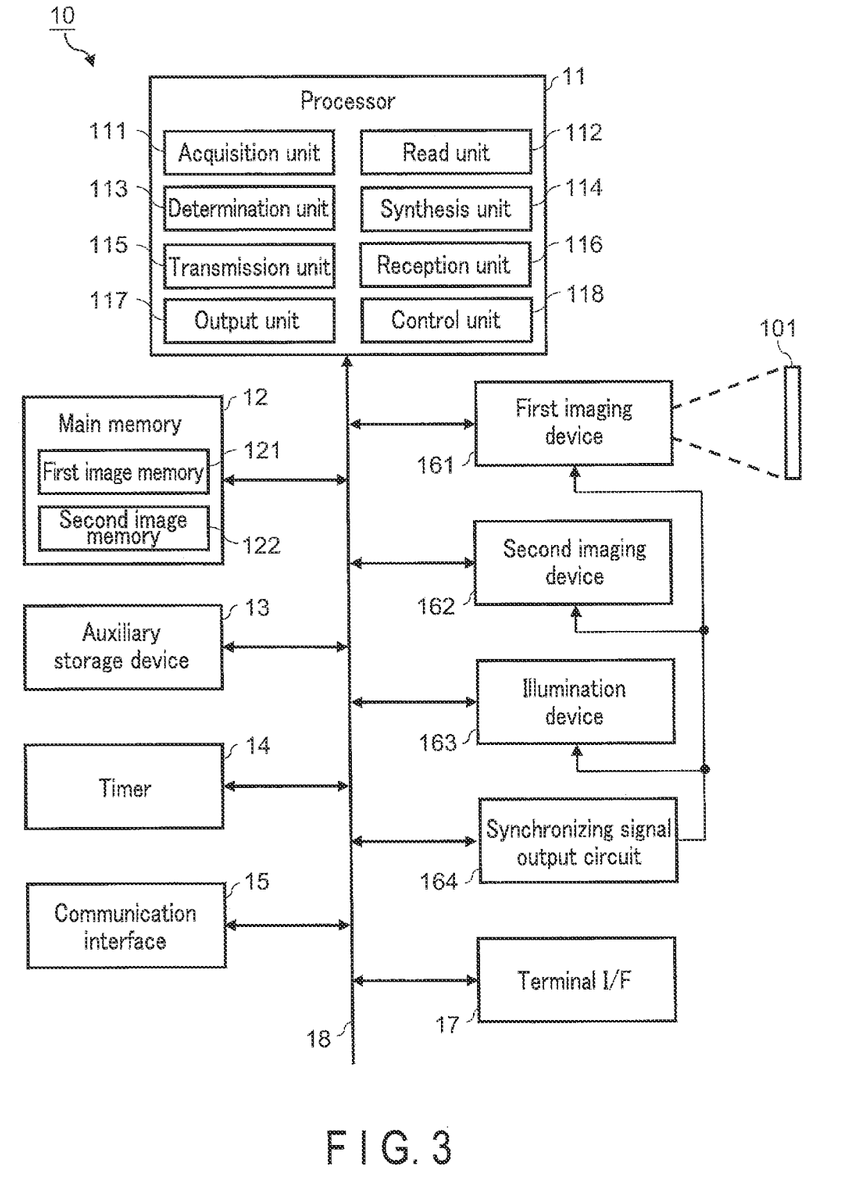
FIG. 3 is a block diagram illustrating a main circuitry configuration of a scanner according to an embodiment.

FIG. 3 is a block diagram illustrating a main circuitry configuration of the scanner 10. The scanner 10 includes a processor 11, a main memory 12, an auxiliary storage device 13, a timer 14, a communication interface 15, a first imaging device 161, a second imaging device 162, an illumination device 163, a synchronizing signal output circuit 164 and a terminal interface 17. The processor 11, main memory 12, auxiliary storage device 13, timer 14, communication interface 15, first imaging device 161, second imaging device 162, illumination device 163, synchronizing signal output circuit 164 and terminal interface 17 are connected by a system transmission path 18. The system transmission path 18 includes an address bus, a data bus, a control signal line, and the like. The scanner 10 constitutes a computer by connecting the processor 11, main memory 12, auxiliary storage device 13 and timer 14 by the system transmission path 18. In addition, the functions of the scanner 10 are implemented by connecting the communication interface 15, first imaging device 161, second imaging device 162, illumination device 163, synchronizing signal output circuit 164 and terminal interface 17 to this computer.

The processor 11 corresponds to a central part of the above-described computer. The processor 11 controls the respective components in order to implement various functions of the scanner 10, according to an operating system or an application program. The processor 11 may be, for example, a processing circuit such as a CPU (Central Processing Unit), a GPU (Graphics Processing Unit), an application specific integrated circuit (ASIC), or a programmable logic device (e.g., a simple programmable logic device (SPLD), a complex programmable logic device (CPLD), or a field programmable gate array (FPGA)). Aside from the case where the processor 11 is composed of a single processing circuit, the processor 11 may be constructed by combining a plurality of processing circuits.

The main memory 12 may be a volatile memory (a random access memory) or a nonvolatile memory (a read-only memory, a nonvolatile random access memory). The main memory 12 stores an information processing program, and data necessary for information processing. The processor 11 implements a predetermined function by reading and executing a program stored in the main memory 12. Note that, instead of storing a program in the main memory 12, a program may be directly embedded in the processor 11. In this case, the processor 11 implements a predetermined function by reading and executing the program embedded therein. Besides, the predetermined function may be implemented not only by the processor 11 executing the program, but may also be implemented by a combination of logic circuits. The same applies to other main memories according to the present embodiment.

The auxiliary storage device 13 corresponds to an auxiliary storage portion of the above-described computer. As the auxiliary storage device 13, for example, a well-known storage device, such as an SSD (Solid State Drive), an HDD (Hard Disc Drive) or an EEPROM (Electric Erasable Programmable Read-Only Memory), is used singly, or a combination of such well-known storage devices are used. The auxiliary storage device 13 stores data that is used by the processor 11 in executing various processes, or data that is created by the processing by the processor 11. In some cases, the auxiliary storage device 13 stores the above-described information processing program.

The information processing program that the main memory 12 or auxiliary storage device 13 stores includes a code reading program. The method of installing the code reading program in the main memory 12 or auxiliary storage device 13 is not particularly limited. By recording a control program in a removable recording medium, or by distributing the code reading program by communication via a network, the code reading program can be installed in the main memory 12, 22 or the auxiliary storage device 13, 23.

The recording medium is in any form, if the recording medium, like a SD memory card or a USB memory, can store a program and can be read by an apparatus.

The timer 14 is a device that starts time counting in accordance with a start signal, and outputs a time-out signal if the count time reaches a predetermined time-out time. In the present embodiment, the time-out time is an operation time that is needed for the image recognition server 30 to recognize the price change information displayed on the price change label 53 from the image of the commodity.

The communication interface 15 is an interface with the image recognition server 30. The communication interface 15 transmits and receives data signals according to a predetermined communication protocol, to and from the image recognition server 30 connected via the communication network 40.

Each of the first imaging device 161 and the second imaging device 162 is a device that includes a CCD (Charge Coupled Device) imaging element that is an area image sensor, a driving circuit that drives the CCD imaging element, and an imaging lens for forming an image of an imaging area onto the CCD imaging element, and that outputs data of the image formed on the CCD imaging element.

The first imaging device 161 and second imaging device 162 image, from different directions, an imaging target at an imaging position. For example, the first imaging device 161 images, from a first direction, an imaging target at an imaging position, and the second imaging device 162 images, from a second direction different from the first direction, the imaging target at the same imaging position. The first direction and the second direction may have a relation of opposite directions, or may have a relation of orthogonal directions. Thereby, the first imaging device 161 outputs an image including one surface (for example, first surface 501) of the imaging target that is presented at the imaging position, and the second imaging device 162 outputs an image including the other surface (for example, second surface 502) of the imaging target presented at the imaging position. In the present embodiment, by way of example, the first imaging device 161 images the first surface 501 of the commodity that is the imaging target, and the second imaging device 162 images the second surface 502 of the commodity that is the imaging target.

The first imaging device 161 is a device configured to image the commodity, which is held over a reading window 101, from the first direction through the reading window 101. The reading window 101 is a window over which an operator of the scanner 10 holds the commodity that is the read target, and is provided on one surface of a housing that constitutes the scanner 10. Accordingly, the first imaging device 161 is provided inside the housing. The first imaging device 161 functions as a first imaging unit.

The second imaging device 162 is a device configured to image the commodity, which is held over the reading window 101, from the second direction without through the reading window 101. Accordingly, the second imaging device 162 is provided near the reading window 101 on the outside of the housing. For example, the second imaging device 162 is provided in such a position as to be able to image the second surface 502, when the operator holds the commodity 50 illustrated in FIG. 2 such that the first surface 501 of the commodity 50 is directed toward the reading window 101. The second imaging device 162 functions as a second imaging unit.

The illumination device 163 radiates light toward the imaging positions of the first imaging device 161 and second imaging device 162. The illumination device 163 is a device that radiates light to the outside of the reading window 101, i.e., toward the space where the commodity is held over the reading window 101. The illumination device 163 uses, for example, an LED as a light source. The illumination device 163 uses a light emitting element, other than the LED, as the light source. The illumination device 163 functions as an illumination unit.

The synchronizing signal output circuit 164 is a circuit for repeatedly outputting a synchronizing signal in fixed cycles. The synchronizing signal is commonly output to the first imaging device 161, second imaging device 162 and illumination device 163. The first imaging device 161 and second imaging device 162 execute imaging operations for a predetermined time in synchronism with the synchronizing signal. The illumination device 163 executes a light emission operation for a predetermined time in synchronism with the synchronizing signal. The cycle of the synchronizing signal is set to be longer than the imaging operation time of the first imaging device 161 and second imaging device 162 and the light emission operation time of the illumination device 163. The imaging operation time and the light emission operation time are set to be substantially equal, or the light emission operation time is set to be slightly longer than the imaging operation time. The synchronizing signal output circuit 164 functions as a synchronizing signal output unit.

The terminal interface 17 is an interface with the POS terminal 20. The terminal interface 17 transmits and receives data signals to and from the POS terminal 20 that is connected by a communication cable.

The scanner 10 includes a first image memory 121 and a second image memory 122, which are portions of the storage area of the main memory 12. The first image memory 121 is an area that stores images captured by the first imaging device 161 in a time-series manner. The second image memory 122 is an area that stores images captured by the second imaging device 162 in a time-series manner.

The processor 11 includes functions of an acquisition unit 111, a read unit 112, a determination unit 113, a synthesis unit 114, a transmission unit 115, a reception unit 116, an output unit 117, and a control unit 118. The acquisition unit 111 is a function of acquiring, in synchronism with the synchronizing signal, a so-called first image that is an image of the commodity captured by the first imaging device 161, and a so-called second image that is an image of the commodity captured by the second imaging device. The acquisition unit 111 can also be described as acquisition means.

The read unit 112 is a function of reading a code for obtaining the price of a commodity, i.e., the bar code 51, from the first image or second image acquired by the acquisition unit 111. An existing technology is utilized as a technology for reading the bar code 51 from the image. The read unit 112 can also be described as read means.

The determination unit 113 is a function of determining whether a label displaying price change information relating to a change of the price obtained by the bar code 51, i.e., the price change label 53, is put on the commodity. The determination unit 113 determines that the price change label 53 is put on the commodity, in a case of detecting the flag seal 54 that is put near the bar code 51. In a case of not detecting the flag seal 54, the determination unit 113 determines that the price change label 53 is not put on the commodity. The determination unit 113 can also be described as determination means.

The synthesis unit 114 is a function of synthesizing the first image and the second image acquired by the acquisition unit 111. For example, the synthesis unit 114 connects the first image, in which the number of pixels in the X-axis direction of X-Y two-dimensional coordinates is Px and the number of pixels in the Y-axis direction is Py, and the second image, in which, similarly, the number of pixels in the X-axis direction is Px and the number of pixels in the Y-axis direction is Py, such that the first image and the second image adjoin each other in the X-axis direction, thereby generating a synthesis image in which the number of pixels in the X-axis direction is 2Px and the number of pixels in the Y-axis direction is Py. Alternatively, the synthesis unit 114 connects the first image and the second image such that the first image and the second image adjoin each other in the Y-axis direction, thereby generating a synthesis image in which the number of pixels in the X-axis direction is Px and the number of pixels in the Y-axis direction is 2Py. The synthesis unit 114 can also be described as synthesis means.

The transmission unit 115 is a function of transmitting the synthesis image generated by the synthesis unit 114 to the image recognition server 30. The transmission unit 115 can also be described as a terminal-side transmission unit or transmission means.

The reception unit 116 is a function of receiving information recognized by the image recognition server 30. The information is, for example, the price change information displayed on the price change label 53. The reception unit 116 can also be described as a terminal-side reception unit or reception means.

The output unit 117 includes the following two functions. The first function is a function of outputting the data of the bar code 51, which is read by the read unit 112, to the POS terminal 20, in a case where the determination unit 113 determines that the price change label 53 is not put on the commodity. The second function is a function of outputting the data of the bar code 51, which is read by the read unit 112, and the price change information received by the reception unit 116, to the POS terminal 20, in a case where the determination unit 113 determines that the price change label 53 is put on the commodity. The output unit 117 can also be described as output means.

The control unit 118 is a function of controlling the operations of starting and stopping the first imaging device 161, second imaging device 162, illumination device 163 and synchronizing signal output circuit 164. The control unit 118 can also be described as control means.

Figure 4:
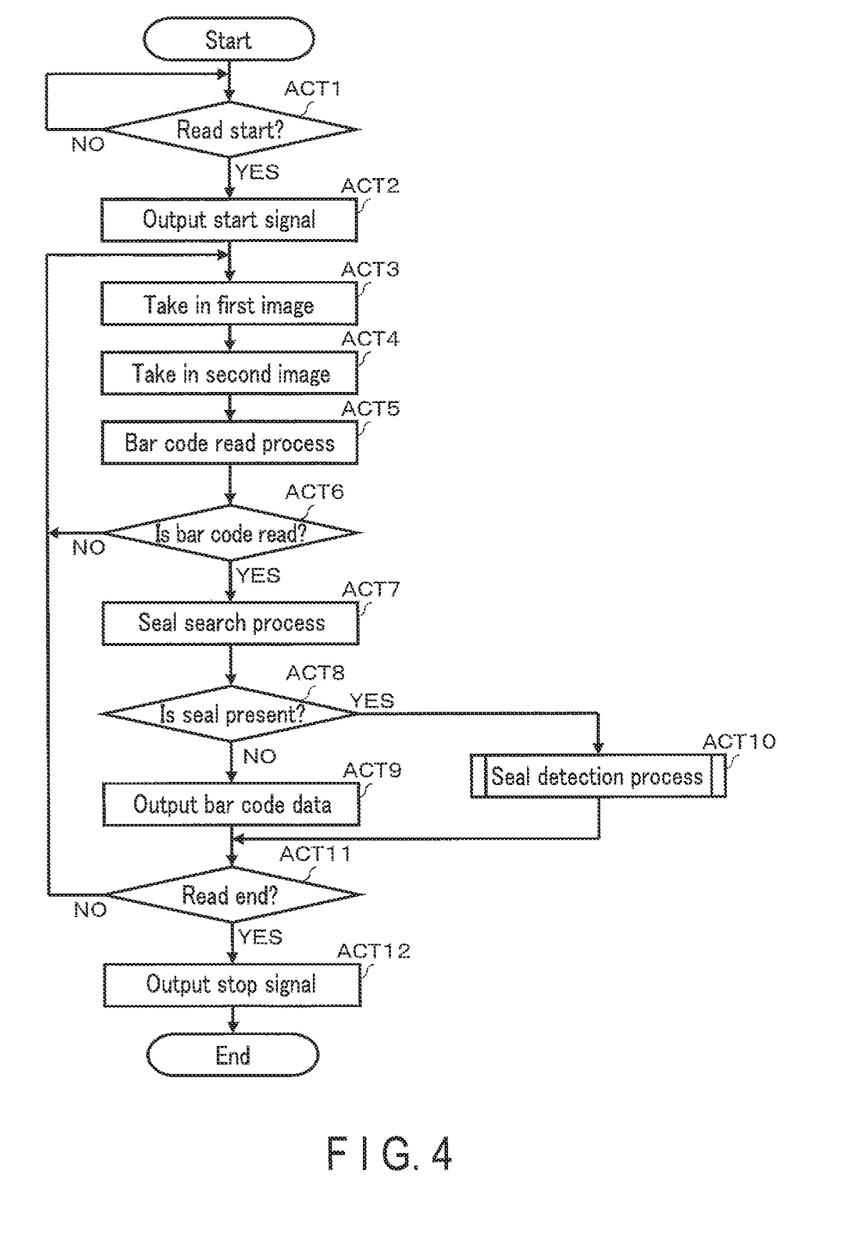
FIG. 4 is a flowchart illustrating a procedure of a main information process in an embodiment, which is executed by a processor of the scanner according to a code reading program.
Figure 5:
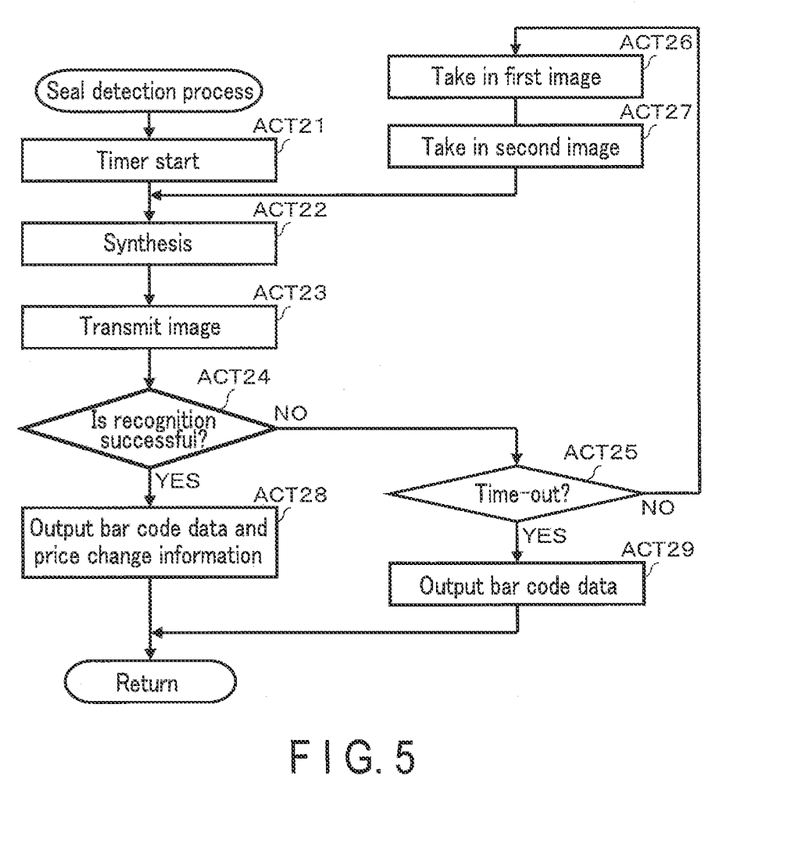
FIG. 5 is a flowchart illustrating a concrete procedure of a seal detection process in FIG. 4.

FIG. 4 and FIG. 5 are flowcharts illustrating a procedure of a main information process that is executed by the processor 11 of the scanner 10 according to a code reading program. Hereinafter, a main operation of the scanner 10 is described according to the flowcharts. Note that the procedure of the information process is not limited to the procedure according to the flowcharts. A change may be made as appropriate, if the same advantageous effects are obtained.

In ACT 1, the processor 11 stands by until a read start instruction is input. The read start instruction is given from the corresponding POS terminal 20. For example, in the POS terminal 20, if a commercial transaction with an immediately preceding customer is settled, a read start instruction is output from the POS terminal 20 to the scanner 10. If the read start instruction is input, the processor 11 determines YES in ACT 1, and advances to ACT 2. In ACT 2, by the function of the control unit 118, the processor 11 outputs start signals to the first imaging device 161, second imaging device 162, illumination device 163 and synchronizing signal output circuit 164.

In the first imaging device 161 and second imaging device 162, to which the start signals were input, the CCD imaging elements are set in an energized state. In the illumination device 163, the light source is set in an energized state. In the synchronizing signal output circuit 164, the intermittent output of a synchronizing signal is started. The synchronizing signal is input to the first imaging device 161, second imaging device 162 and illumination device 163. In the first imaging device 161 to which the synchronizing signal was input, in synchronism with the synchronizing signal, the data of images formed on the CCD imaging element are successively written in the first image memory 121. In the second imaging device 162 to which the synchronizing signal was input, in synchronism with the synchronizing signal, the data of images formed on the CCD imaging element are successively written in the second image memory 122. In the illumination device 163 to which the synchronizing signal was input, in synchronism with the synchronizing signal, the light source is caused to emit light at a predetermined strength. Specifically, the synchronizing signal is a signal that synchronizes the imaging timing of the first imaging device 161 and the imaging timing of the second imaging device 162. In addition, the synchronizing signal is a signal that synchronizes the imaging timings and the light emission timing of the illumination device 163.

In ACT 3, by the function of the acquisition unit 111, the processor 11 takes in a so-called first image that is the image stored in the first image memory 121. In addition, in ACT 4, by the function of the acquisition unit 111, the processor 11 takes in a so-called second image that is the image stored in the second image memory 122. The first image and the second image are images captured by the first imaging device 161 and second imaging device 162 in synchronism with the synchronizing signal. Specifically, the processor 11 acquires the first image captured by the first imaging device 161 and the second image captured by the second imaging device 162, which were captured at the same imaging timing.

In ACT 5, by the function of the read unit 112, the processor 11 reads the bar code 51 from the first image. In ACT 6, the processor 11 confirms whether the bar code 51 was read. If the bar code 51 was not read from the first image, the processor 11 determines NO in ACT 6, and returns to ACT 3. In this manner, the processor 11 repeats the process of successively taking in the first image and the second image, which were captured in synchronism with the synchronizing signal, from the first image memory 121 and the second image memory 122, and reading the bar code 51 from the first image. As a result, if the bar code 51 was read, the processor 11 determines YES in ACT 6, and advances to ACT 7.

In ACT 7, by the function of the determination unit 113, the processor 11 determines whether the price change label 53 is put on the commodity. Specifically, the processor 11 searches the flag seal 54 from the first image, from which the bar code 51 was read. In ACT 8, the processor 11 confirms whether the flag seal 54 was detected.

If the price change label 53 is not put on the commodity, the flag seal 54 is not detected. If the flag seal 54 is not detected, the processor 11 determines NO in ACT 8, and advances to ACT 9. In ACT 9, by the function of the output unit 117, the processor 11 outputs the data of the bar code 51 to the POS terminal 20 via the terminal interface 17.

If the price change label 53 is put on the commodity, the flag seal 54 is detected in principle. If the flag seal 54 was detected, the processor 11 determines YES in ACT 8, and advances to ACT 10. The processor 11 executes a seal detection process in ACT 10. The seal detection process will be described later.

Upon finishing the process of ACT 9 or ACT 10, the processor 11 advances to ACT 11. In ACT 11, the processor 11 confirms whether a read end instruction is input. The read end instruction is given from the corresponding POS terminal 20. For example, if a closing operation, which instructs the end of registration of the commodity that the customer purchases, is executed in the POS terminal 20, the read end instruction is output from the POS terminal 20 to the scanner 10. If the read end instruction is not input, the processor 11 determines NO in ACT 11, and returns to ACT 3. The processor 11 executes the process of ACT 3 onwards in the same manner as described above.

If the read end instruction is input, the processor 11 determines YES in ACT 11, and advances to ACT 12. In ACT 11, by the function of the control unit 118, the processor 11 outputs stop signals to the first imaging device 161, second imaging device 162, illumination device 163 and synchronizing signal output circuit 164. In the first imaging device 161 and second imaging device 162, to which the stop signals were input, the CCD imaging elements are set in a non-energized state. In the illumination device 163, the light source is set in a non-energized state. In the synchronizing signal output circuit 164, the output of the synchronizing signal is stopped. By the above, the processor 11 terminates the information process of the procedure illustrated in the flowchart of FIG. 4. The processor 11 stands by, once again, until a read start instruction is input.

FIG. 5 is a flowchart illustrating a concrete procedure of the seal detection process. Entering the seal detection process, the processor 11 starts the timer 14 in ACT 21. In addition, in ACT 22, by the function of the synthesis unit 114, the processor 11 synthesizes the first image acquired by the process of ACT 3 and the second image acquired by the process of ACT 4. In ACT 23, by the function of the transmission unit 115, the processor 11 transmits the data of the synthesis image between the first image and the second image to the image recognition server 30 via the communication interface 15.

The image recognition server 30 includes functions of a server-side reception unit, a server-side recognition unit and a server-side transmission unit. If the image recognition server 30 receives the image data via the communication network 40 by the function of the server-side reception unit, the image recognition server 30 recognizes, by the function of the server-side recognition unit, the price change information displayed on the price change label 53 from the image of the image data. Upon recognizing the price change information, the image recognition server 30 transmits, by the function of the server-side transmission unit, a response command of recognition success to the scanner 10, which is the transmission source of the image data, via the communication network 40. The response command of recognition success includes the price change information that could be recognized.

Here, the image that the image recognition server 30 receives is the synthesis image in which the first image and the second image are connected by the function of the synthesis unit 114 included in the scanner 10. The image recognition server 30 recognizes the synthesis image by dividing the synthesis image into the first image and second image. For example, the data of the synthesis image, which is transmitted from the scanner 10 to the image recognition server 30, includes information of the number of pixels (Px, Py) of the first image and the number of pixels (Px, Py) of the second image. The image recognition server 30 executes the recognition process by dividing the synthesis image into the first image and second image, based on the number of pixels (Px, Py).

For example, the image recognition server 30 first executes the recognition process for the second image, and, if the price change information could not be recognized, the image recognition server 30 executes the recognition process for the first image. Alternatively, the image recognition server 30 first executes the recognition process for the first image, and, if the price change information could not be recognized, the image recognition server 30 executes the recognition process for the second image. In the case of frequently adopting such practical use that the price change label 53 is put on the second surface 502 of the commodity 50, the former can increase the recognition speed. Conversely, In the case of frequently adopting such practical use that the price change label 53 is put on the first surface 501 of the commodity 50, the latter can increase the recognition speed.

If the image recognition server 30 can recognize the price change information displayed on the price change label 53 from the first image or the second image, the image recognition server 30 transmits the response command of recognition success to the scanner 10 that is the transmission source of the image data.

In ACT 24, by the function of the reception unit 116, the processor 11 of the scanner 10, which transmitted the data of the synthesis image, confirms whether the response command of recognition success is received from the image recognition server 30. If the response command is not received, the processor 11 determines NO in ACT 24, and advances to ACT 25. In ACT 25, the processor 11 confirms whether the timer 14 times out. If the timer 14 does not time out, the processor 11 determines NO in ACT 25, and advances to ACT 26.

In ACT 26, by the function of the acquisition unit 111, the processor 11 takes in the first image stored in the first image memory 121. In addition, in ACT 27, by the function of the acquisition unit 111, the processor 11 takes in the second image stored in the second image memory 122. The first image and the second image are images captured by the first imaging device 161 and second imaging device 162 in synchronism with the synchronizing signal. Specifically, also in ACT 26 and ACT 27, the processor 11 acquires the first image captured by the first imaging device 161 and the second image captured by the second imaging device 162, which were captured at the same imaging timing. Then, the processor 11 repeats the process of ACT 22 onwards in the same manner as described above. Accordingly, the synthesis image between the first image and the second image, which are captured at the same imaging timing, is repeatedly transmitted from the scanner 10 to the image recognition server 30, until the price change information is recognized by the image recognition server 30, or until the timer 14 times out.

If the processor 11 receives, by the function of the reception unit 116, the response command of recognition success from the image recognition server 30 via the communication interface 15, the processor 11 determines YES in ACT 24, and advances to ACT 28. In ACT 28, by the output function of the output unit 117, the processor 11 outputs the data of the bar code read by the process of ACT 5 and the price change information, which is included in the response command of recognition success, to the POS terminal 20 via the terminal interface 17.

On the other hand, if the timer 14 times out without the reception of the response command of recognition success from the image recognition server 30, the processor 11 determines YES in ACT 25, and advances to ACT 29. In ACT 29, by the function of the output unit 117, the processor 11 outputs the bar code data read by the process of ACT 5 to the POS terminal 20 via the terminal interface 17.

If the process of ACT 28 or ACT 29 is finished, the processor 11 terminates the seal detection process. The processor 11 advances to the above-described process of ACT 11.

In the reading system 100 including the scanner 10 and the image recognition server 30 that operate as described above, the following advantageous effects can be obtained. To begin with, if a read start instruction is given from the POS terminal 20 to the scanner 10 before the registration of a first commodity that the customer purchases, the first imaging device 161, second imaging device 162, illumination device 163 and synchronizing signal output circuit 164 of the scanner 10 are started. In this state, the operator takes, one by one, the commodities that the customer purchases, and holds the first surface 501, on which the bar code label 52 is put, towards the reading window 101. Note that the operator may be either a store clerk or a customer.

If the first surface 501, on which the bar code label 52 is put, is held toward the reading window, an image of the first surface 501 is captured by the first imaging device 161 in the scanner 10. In addition, an image of the second surface 502 is captured by the second imaging device 162. Here, the first imaging device 161 and second imaging device 162 execute the imaging operations in synchronism with the synchronizing signal that is output from the synchronizing signal output circuit 164. Accordingly, the first image written in the first image memory 121 and the second image written in the second image memory 122 are images captured at the same timing. Besides, in synchronism with the imaging timing of the first imaging device 161 and second imaging device 162, the illumination device 163 radiates light toward the vicinity of the reading window 101. Here, the time of radiation by the illumination device 163 is equal to or slightly longer than the imaging time by the first imaging device 161 and second imaging device 162. Accordingly, the first image and second image become clear images, with a sufficient amount of light being given.

In the scanner 10, the bar code 51 printed on the bar code label 52 is read, based on the first image. In addition, in the scanner 10, it is confirmed whether the flag seal 54 is attached near the bar code label 52. If the flag seal 54 is not attached, i.e., if the bar code 51 of a commodity other than a price change object is read, the data of the bar code 51 of the commodity is output from the scanner 10 to the POS terminal 20. As a result, in the POS terminal 20, a registration process for the commodity sales data is executed at the price obtained from the data of the bar code 51.

If the flag seal 54 is attached, i.e., if the bar code 51 of the commodity that is the price change object is read, the first image and the second image, which were captured in synchronism with the synchronizing signal, are synthesized in the scanner 10. Then, the synthesis image is transmitted from the scanner 10 to the image recognition server 30.

In the image recognition server 30, the price change information displayed on the price change label 53 is recognized from the synthesis image. Then, if the price change information is recognized, the price change information of the price change label 53, together with the data of the bar code 51, is output from the scanner 10 to the POS terminal 20. As a result, in the POS terminal 20, the registration process for the commodity sales data is executed at a price to which the price obtained from the data of the bar code 51 was changed based on the price change information.

In this manner, in the reading system 100, when the commodity of the price change object, on which the price change label 53 is put along with the bar code label 52, is registered, the process of reading the bar code 51 is executed by the scanner 10, and the recognition process of the price change information displayed on the price change label 53 is executed by the image recognition server 30. In this case, the first image and the second image, which are captured at the same imaging timing, are synthesized and transmitted from the scanner 10 to the image recognition server 30. Accordingly, the first image captured by the first imaging device 161 and the second image captured by the second imaging device 162 are not transmitted asynchronously from the scanner 10 to the image recognition server 30. Thus, in the image recognition server 30, there is no concern that the image recognition is not correctly executed because of a change of the order of images. Even in the scanner 10 that reads information of a plurality of commodities, which are successively held over the reading window 101, there is no possibility that, between images of one commodity, an image of another commodity is interposed, resulting in erroneous recognition.

Thus, the image recognition server 30 can be entrusted with the recognition process of the first image captured by the first imaging device 161 of the scanner 10 and the second image captured by the second imaging device 162. As a result, a high-performance code reading system can be constructed.

Furthermore, it suffices if the illumination device 163 emits light for a predetermined time in synchronism with the synchronizing signal. Accordingly, since there is no need to continuously emit light, for example, during a period from the read start to the read end, there is a merit that useless illumination can be eliminated.

Second Embodiment

Next, a second embodiment is described with reference to FIG. 6 and FIG. 7. Incidentally, FIG. 1 to FIG. 3 described in the first embodiment are also used commonly to the second embodiment. Thus, a description thereof is omitted.

Figure 6:
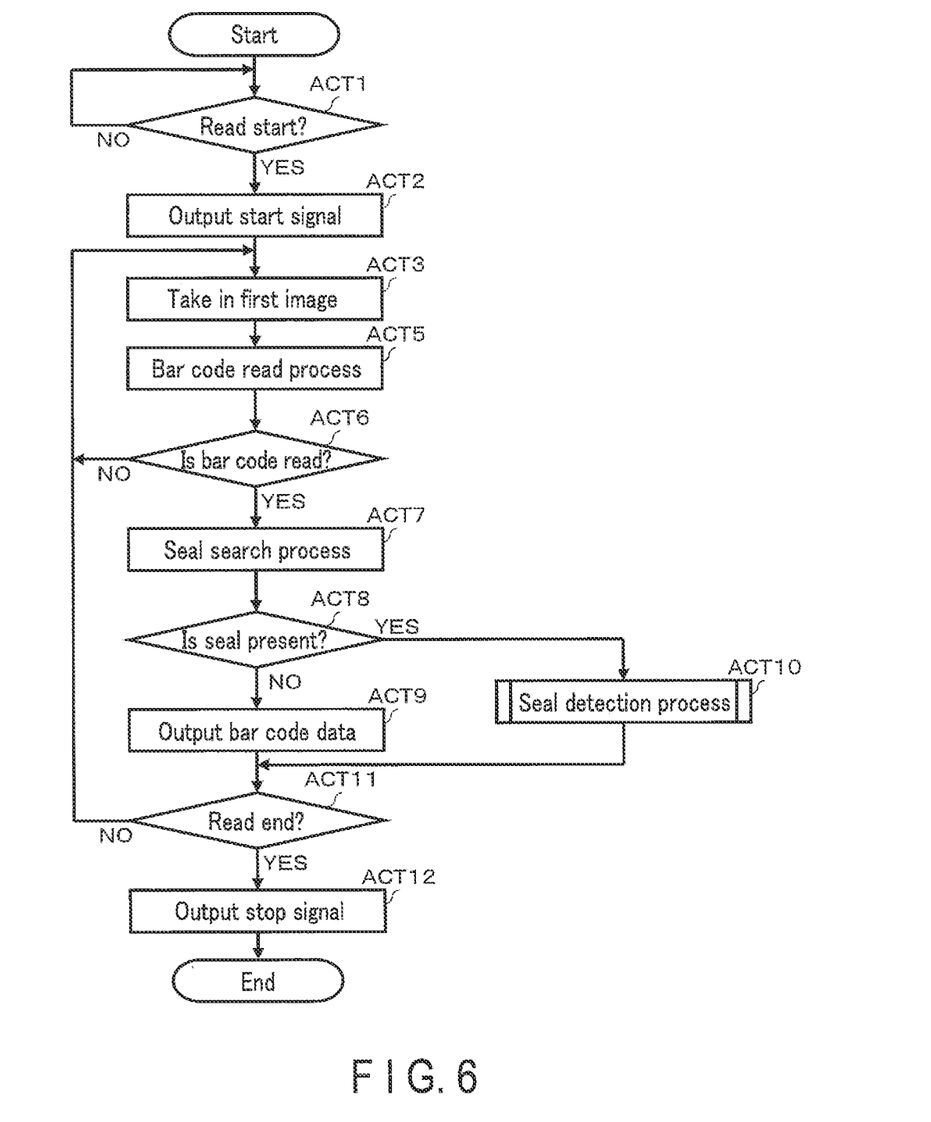
FIG. 6 is a flowchart illustrating a procedure of a main information process in another embodiment, which is executed by a processor of a scanner according to a code reading program.
Figure 7:
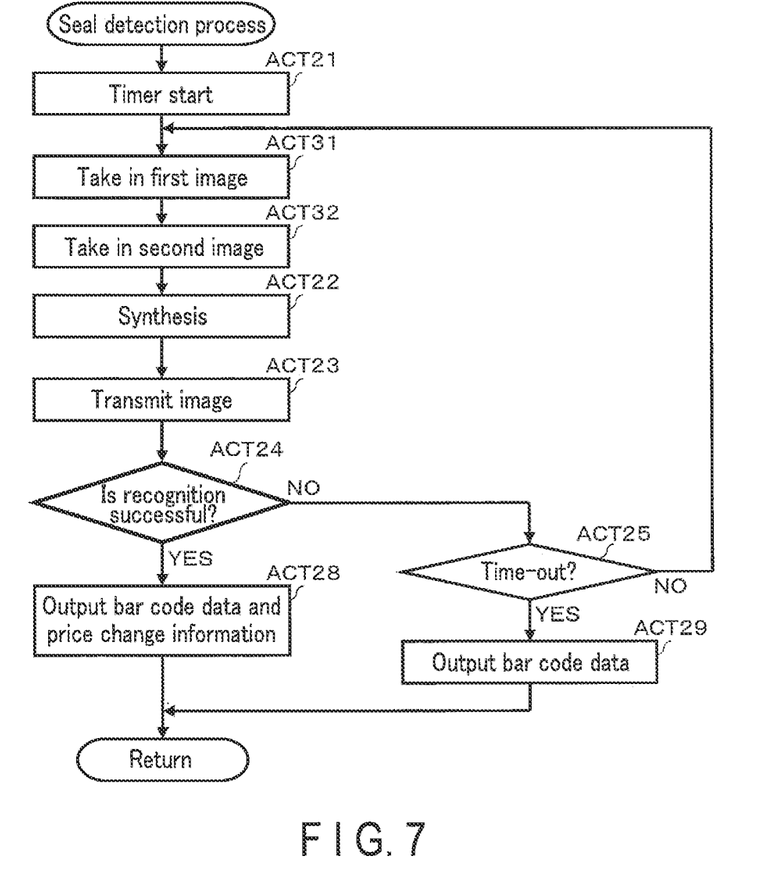
FIG. 7 is a flowchart illustrating a concrete procedure of a seal detection process in FIG. 6.

FIG. 6 and FIG. 7 are flowcharts illustrating a procedure of a main information process that is executed by the processor 11 of the scanner 10 according to a code reading program in the second embodiment. FIG. 6 corresponds to FIG. 4 described in the first embodiment, and FIG. 7 corresponds to FIG. 5. Thus, the same process steps as in the first embodiment are denoted by identical reference signs.

As is understood by comparing FIG. 6 and FIG. 4, in the second embodiment, unlike the first embodiment, the process of ACT 4 is omitted in the processor 11 of the scanner 10. In principle, the operator holds the surface with the bar code 51 over the reading window 101.

Accordingly, if the processor 11, in ACT 3, takes in the image of the first imaging device 161, i.e., the first image, which is captured by imaging, through the reading window 101, the commodity that is held over the reading window 101, the processor 11 executes in ACT 5 the bar code reading process by using the first image. Further, the processor 11 executes, in ACT 7, the search process for the flag seal 54 by using the first image. As a result, if the flag seal 54 is detected, the processor 11 executes the seal detection process, the procedure of which is concretely illustrated in FIG. 7.

Here, as is understood by comparing FIG. 7 and FIG. 5, in the second embodiment, after the timer 14 is started in ACT 21, the first image captured by the first imaging device 161 is taken in, in ACT 31, in synchronism with the synchronizing signal, and furthermore the second image captured by the second imaging device 162 is taken in, in ACT 32, in synchronism with the synchronizing signal. Then, in ACT 22, the processor 11 synthesizes the first image and the second image. The subsequent process is the same as in the first embodiment.

In this manner, in the second embodiment, at first, the bar code reading process and the search process for the flag seal 54 are executed by using the first image. Then, if the flag seal 54 is detected, the synthesis image between the first image and the second image, which are captured by the first imaging device 161 and the second imaging device 162 in synchronism with the synchronizing signal, is transmitted to the image recognition server 30. With this configuration, too, the advantageous effects described in the first embodiment can be obtained.

Moreover, if the bar code of a commodity other than the price change object is read, the step of taking in the second image is omitted in the scanner 10. For example, it is considered that commodities, to which the price change labels 53 are added as commodities of price change objects, are a very small part of the commodities sold in a supermarket. Thus, according to the second embodiment, there is a merit that useless process steps of the scanner 10 can be made simpler.

The first and second embodiments have been described above, but the embodiments are not limited to these.

The number of imaging devices included in the reading apparatus may be three or more. For example, in the scanner 10 of the first embodiment, an imaging device, which can image a third surface of a commodity held over the reading window 101, may be added. In this case, the acquisition unit 111 acquires a first image, a second image and a third image, which are captured in synchronism with the synchronizing signal. The synthesis unit 114 synthesizes the first image, the second image and the third image. The transmission unit 115 transmits the image synthesized by the synthesis unit 114 to the image recognition server 30. Thereby, even in a case where the price change label 53 is added to the third surface other than the first surface 501 or the second surface 502, the price change information of the price change label 53 can be recognized.

The illumination device 163 may be omitted if a sufficient amount of light is obtained by, for example, natural light for the space where the commodity is held over the reading window 101. Alternatively, such control may be executed that the control unit 118 does not operate the illumination device 163.

In the present embodiment, the case was exemplarily illustrated in which the scanner 10 includes the function of the synthesis unit 114, and synthesizes the first image and the second image and transmits the synthesized image to the image recognition server 30. In another embodiment, the first image and the second image may not be synthesized, and, by adding information identifying the synchronizing signal to each of the first image and the second image, the first image and the second image may be correlated, and the transmission unit 115 may transmit the correlated first and second images to the image recognition server 30. In this case, too, the image recognition server 30 can prevent erroneous recognition by recognizing the correlated first image and second image as images that are captured at the same imaging timing.

In the above-described embodiments, the case was exemplarily illustrated in which the scanner 10 and the POS terminal 20 are connected by the communication cable. In another embodiment, an apparatus in which the scanner 10 and POS terminal 20 are integrated, for example, a self-type check-out terminal, may be implemented as one mode of the code reading apparatus.

The scanner 10 may include devices such as a keyboard, a touch panel and a display, and may be adaptive to registration of a commodity such as fresh food, to which a bar code is not added. In this case, if an instruction indicating that the price change label 53 is put on the commodity is given to the scanner 10 by, for example, a key operation, the scanner 10 transmits the synthesis image between the first image and second image of the same imaging timing to the image recognition server 30 by the functions of the acquisition unit 111, read unit 112 and transmission unit 115. In the case of adopting this configuration, too, a high-performance image recognition system can be provided.

The image that the image recognition server 30 recognizes is not limited to the price change information displayed on the price change label 53. For example, such a practical use is conceivable that a label displaying a best-before date is put on a commodity, and a discount rate is changed in accordance with the length of a period until the best-before date. In this case, the image that the image recognition server 30 recognizes is the information of the best-before date displayed on the label. It should be noted, however, that since the information of the best-before date eventually becomes information for changing the price, the information of the best-before date can also be described as the price change information.

In addition, the image that the image recognition server 30 recognizes may be an external appearance image of a commodity. In recent years, there is a technology for identifying a commodity from features of an image captured by photographing the external appearance of the commodity. Thus, the scanner 10 of the present embodiment is applied to a system including the image recognition server 30 for image recognition from a plurality of images captured by photographing the external appearance of the commodity from multiple directions by a plurality of imaging devices. In this case, too, since images captured at the same imaging timing are correlated and transmitted from the scanner 10 to the image recognition server 30, a recognition system with high recognition accuracy can be constructed. Note that in this case the functions of the read unit 112 and determination unit 113 are unnecessary.

The program according to the present embodiment may be transferred in a state in which the program is stored in an electronic device, or may be transferred in a state in which the program is not stored in an electronic device. In the latter case, the program may be transferred via a network, or may be transferred in a state in which the program is recorded in a recording medium. The recording medium is a non-transitory tangible medium. The recording medium is a computer-readable medium. The recording medium is in any form, if the recording medium is a medium, such as a CD-ROM, a memory card or the like, which can store the program and is readable by a computer.

While certain embodiments of the present invention have been described, these embodiments have been presented by way of example only, and are not intended to limit the scope of the invention. These novel embodiments may be implemented in a variety of other forms, and various omissions, substitutions and changes may be made without departing from the spirit of the inventions. These embodiments and their modifications fall within the scope and spirit of the invention and within the inventions of the accompanying claims and their equivalents.

What is claimed is:

1. A reading apparatus comprising:
a synchronizing signal output unit configured to output a synchronizing signal;
a first imaging unit configured to image a read target at an imaging position through a reading window in synchronism with the synchronizing signal;
a second imaging unit configured to image the read target at the imaging position without through the reading window in synchronism with the synchronizing signal;
an acquisition unit configured to acquire a first image of the read target captured by the first imaging unit in synchronism with the synchronizing signal, and a second image of the read target captured by the second imaging unit in synchronism with the synchronizing signal; and
a transmission unit configured to correlate the first image and the second image acquired by the acquisition unit, and to transmit the correlated first image and second image to an image recognition server configured to recognize an image of the read target.

2. The reading apparatus of claim 1, further comprising a synthesis unit configured to synthesize the first image and the second image acquired by the acquisition unit, thereby creating one image, wherein
the transmission unit transmits the image created by the synthesis unit to the image recognition server.

3. The reading apparatus of claim 2, further comprising a determination unit configured to determine whether or not to transmit an image to the image recognition server from the first image, wherein
in a case where the determination unit determines to transmit the image, the synthesis unit synthesizes the first image and the second image and creates one image.

4. The reading apparatus of claim 2, further comprising a determination unit configured to determine whether or not to transmit an image to the image recognition server from the first image, wherein
in a case where the determination unit determines to transmit the image, the acquisition unit acquires the first image captured by the first imaging unit in synchronism with the synchronizing signal, and the second image captured by the second imaging unit in synchronism with the synchronizing signal.

5. The reading apparatus of claim 1, further comprising an illumination unit configured to radiate light toward the imaging position in synchronism with the synchronizing signal.

6. A reading method of a reading apparatus including a first imaging unit configured to image a read target at an imaging position through a reading window, and a second imaging unit configured to image the read target at the imaging position without through the reading window, the reading method comprising:
synchronizing an imaging timing of the first imaging unit and an imaging timing of the second imaging unit;
acquiring a first image of the read target captured by the first imaging unit, and a second image of the read target captured by the second imaging unit, the first image and the second image being captured at an identical imaging timing; and
correlating the first image and the second image that are acquired, and transmitting the correlated first image and second image to an image recognition server configured to recognize an image of the read target.

* * * * *